(No Model.) 5 Sheets—Sheet 2.

J. MANN.
PLANING MACHINE.

No. 595,722. Patented Dec. 21, 1897.

Witnesses:
W. A. Schaefer
Craig Shields

Inventor,
James Mann,
By his attorney Chas. A. Rutter

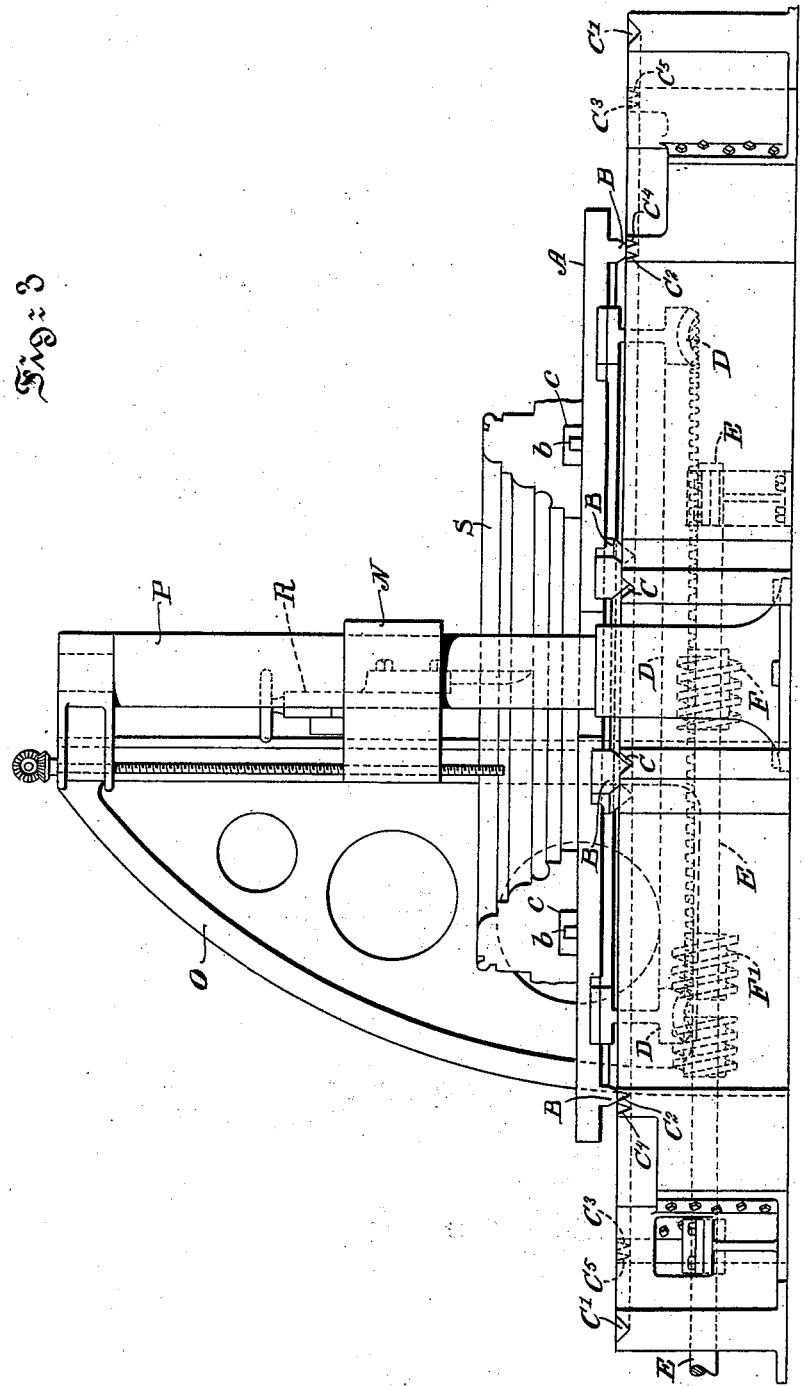

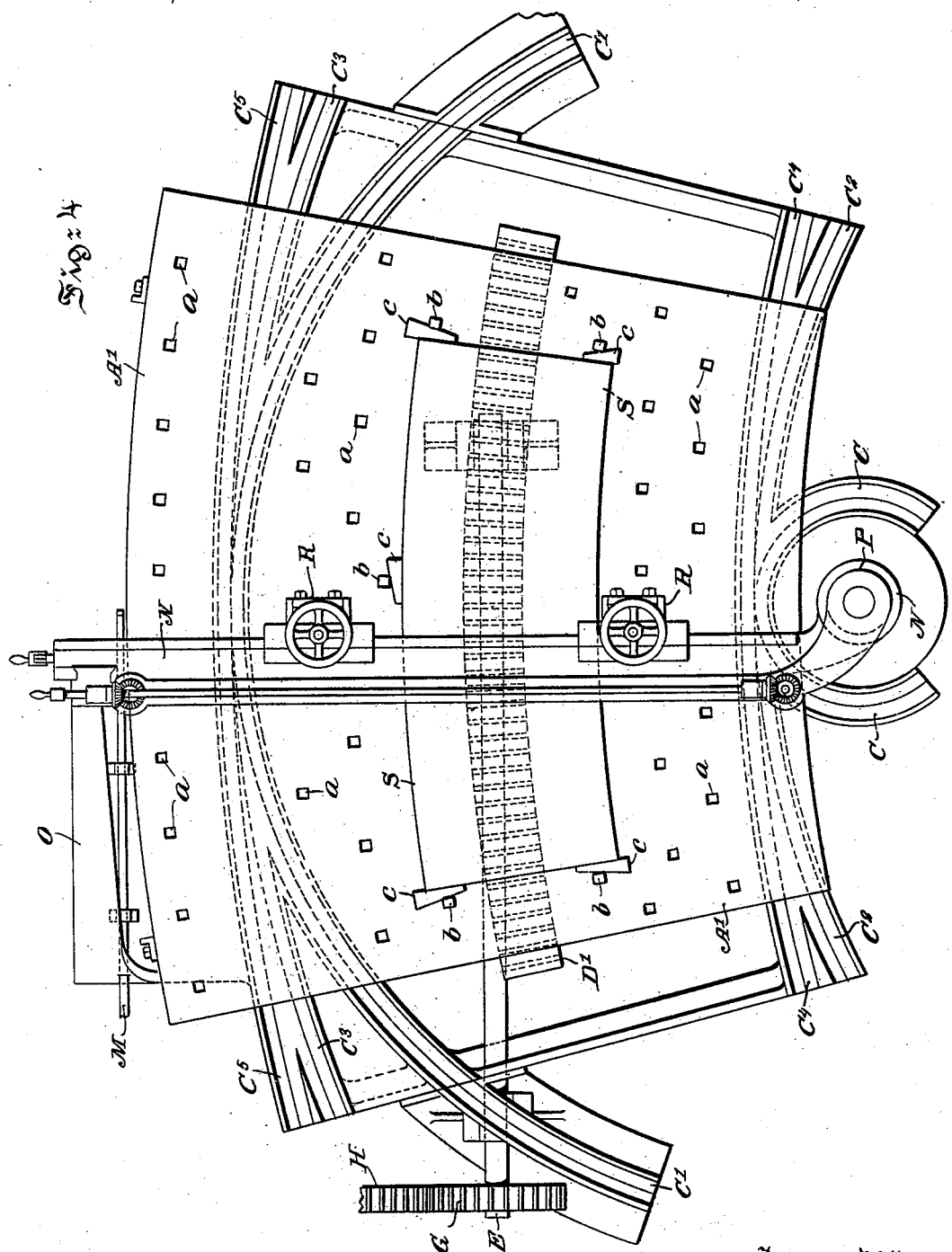

(No Model.)
J. MANN.
PLANING MACHINE.
No. 595,722.
5 Sheets—Sheet 5.
Patented Dec. 21, 1897.
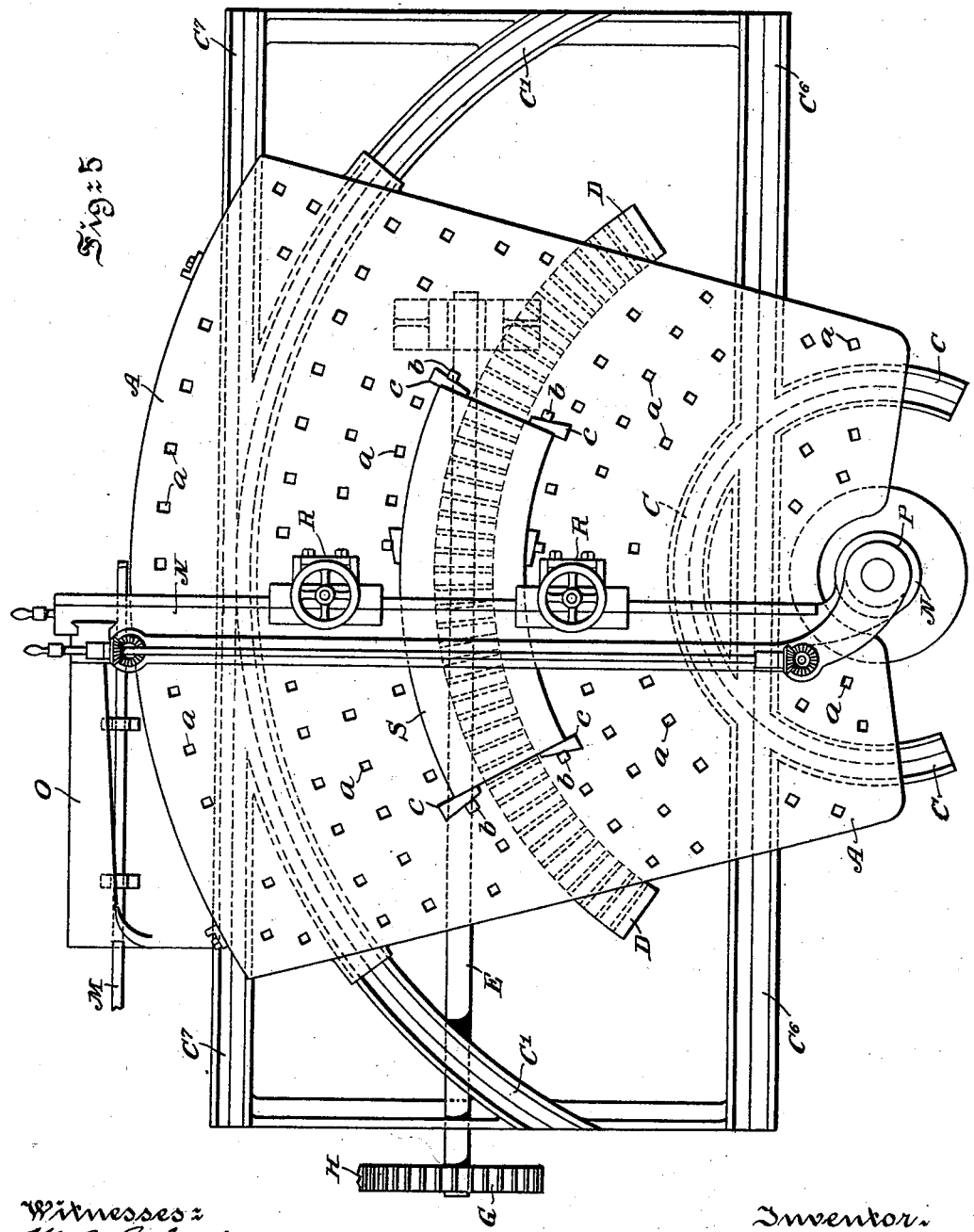

UNITED STATES PATENT OFFICE.

JAMES MANN, OF PHILADELPHIA, PENNSYLVANIA.

PLANING-MACHINE.

SPECIFICATION forming part of Letters Patent No. 595,722, dated December 21, 1897.

Application filed February 25, 1897. Serial No. 624,962. (No model.)

*To all whom it may concern:*

Be it known that I, JAMES MANN, a citizen of the United States, and a resident of the city and county of Philadelphia, State of Pennsylvania, have invented certain new and useful Improvements in Planing-Machines, of which the following is a specification.

My invention relates to improvements in planing-machines, and more particularly to improvements in machines for planing or forming segmental blocks of stone, the object of my invention being to furnish a machine which with slight and easily-made changes will cut a block of stone into a circular segmental form of any radius commonly used in arches of buildings, &c.—that is to say, a radius of from three feet or less to one of twenty feet or more.

Figure 1:
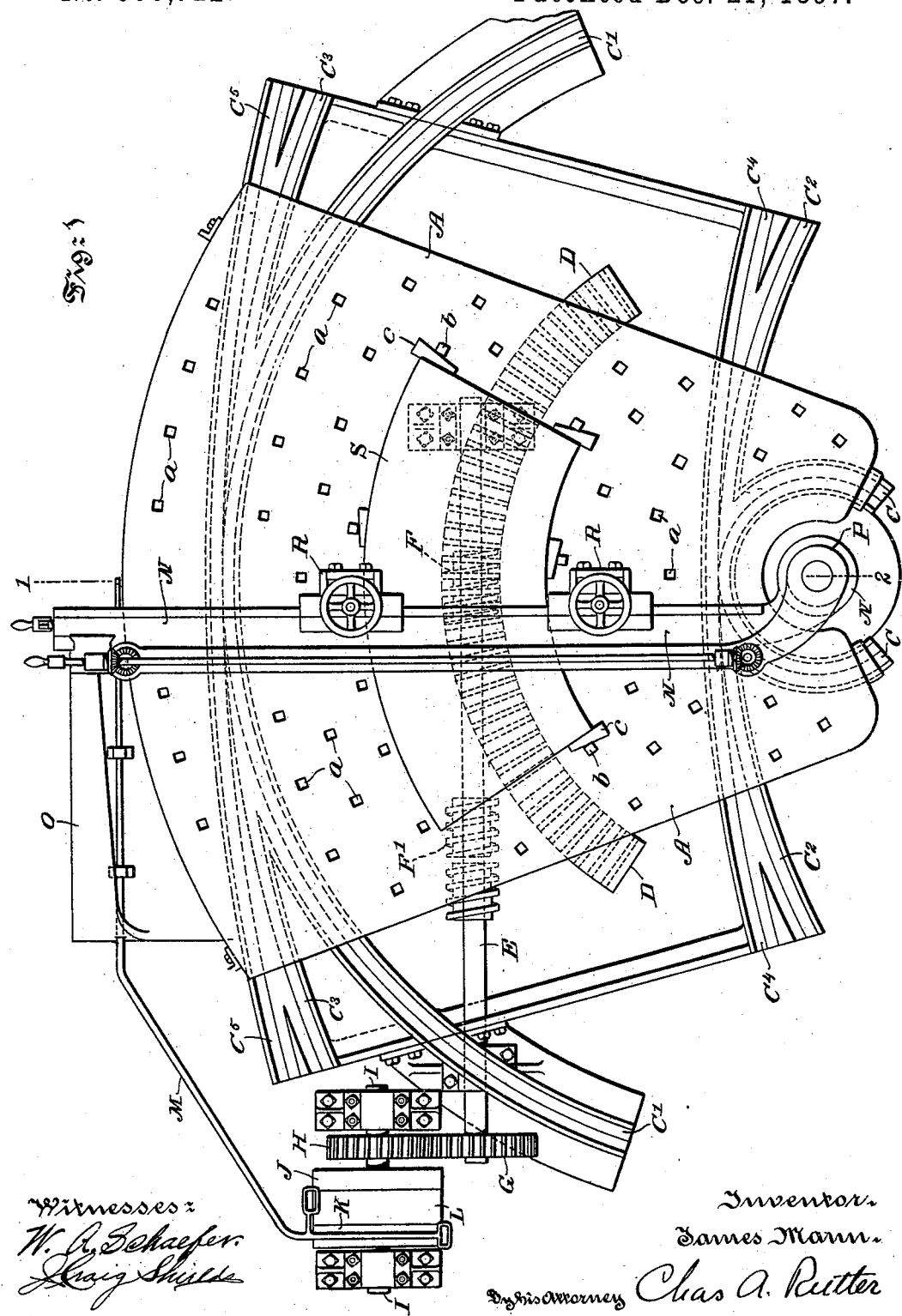
Figure 2:
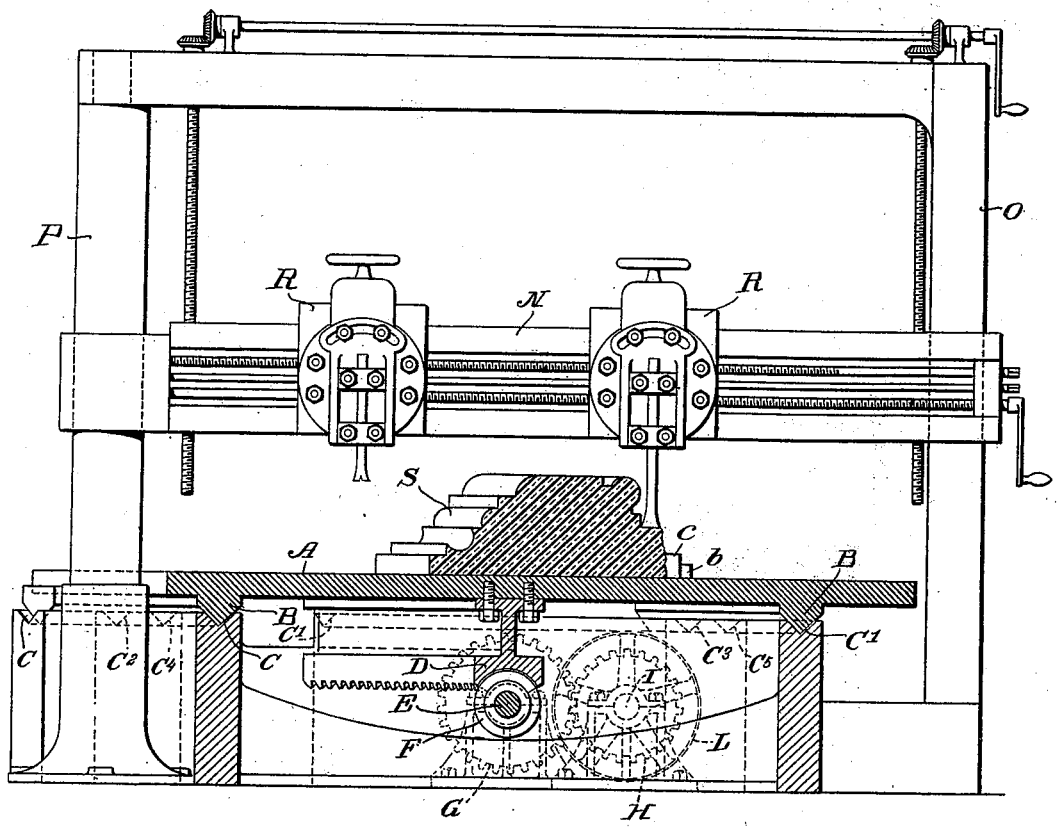

In the accompanying drawings, forming part of this specification and in which similar letters of reference indicate similar parts throughout the several views, Figure 1 is a plan of a stone-planing machine embodying my improvements; Fig. 2, a section of Fig. 1 on line 1 2; Fig. 3, a side elevation of Fig. 1; Fig. 4, a view similar to that shown in Fig. 1, showing the machine fitted with a bed-plate adapted to cut segments of a larger radius; and Fig. 5, a plan of a modified form of machine adapted to cut either straight lines or arcs of circles.

A, Figs. 1, 2, and 3, is a bed-plate adapted to carry the stone to be cut, and furnished on its under side with guides B, adapted to run in or on tracks or guides C C', which have the form of concentric circular arcs.

D is a segmental rack concentric with tracks C C', which is cast with or bolted to the under side of plate A.

E is a shaft carrying a screw F, tangent to and gearing with rack D and by means of which this rack and the bed-plate are driven.

G, Figs. 1 and 2, is a gear-wheel fast on shaft E, which meshes with and is driven by a gear-wheel H, which is fast on a shaft I, carrying two fast pulleys J K and a loose pulley L. The fast pulleys are driven one by a straight belt and the other by a crossed belt, (not shown,) which belts are, by means of a belt-shifter M, adapted to be simultaneously moved one from its fast pulley to the loose pulley, the other from the loose pulley to its fast pulley, and vice versa, as is usual in machines of this class where it is necessary to reverse the driving-gear in order to obtain a reciprocating motion.

N is a cross-head, one end of which is carried by a frame O and the other by a post P, upon which it is capable of a vertical movement, as usual. The purpose of the post P is to interfere as little as possible with the movement of the bed-plate A, which turns about this post, although it is in no way connected with it, as shown in the drawings.

R are tool-holders carried on cross-head N, which are capable of a longitudinal adjustment on said cross-head, and in addition are in themselves capable of a vertical and a rotary adjustment, as is usual.

The bed-plate A is furnished with a number of perforations or holes $a$, into which pins $b$ may be driven, which, together with wedges $c$, hold the block of stone S to be cut in position on the bed-plate.

The bed-plate shown in Figs. 1, 2, and 3 is adapted to travel in an arc of small radius and will cut arcs of, say, from three to ten feet, depending upon the position of the stone upon the plate. The bed-plate is driven to and fro by means of rack D and screw F through the mechanism shown or by means of any other suitable and well-known mechanism.

If it is desired to cut an arc of greater radius than is possible on the plate shown in Figs. 1, 2, and 3, this plate is removed and a plate A', Fig. 4, furnished with guides corresponding to the guides B, Figs. 1, 2, and 3, but of a radius corresponding to that of the tracks $C^2 C^3$, is placed on the machine. The tracks $C^2 C^3$ are of greater radius than that of tracks C C' and are adapted to guide plate A' so that arcs of, say, from seven to fourteen feet radius may be cut upon a stone suitably secured to the bed A', depending, of course, upon the position of the stone S upon the bed. The bed A' is furnished with a rack D', which is concentric with tracks $C^2 C^3$ and is driven by a screw F', Fig. 1, on shaft E, as is the rack D previously described.

$C^4 C^5$ are a third set of tracks similar to those already described, which are adapted to carry a bed-plate to cut still larger arcs than is possible on plate A', the arrangement of the third bed-plate being similar to that of those already described.

The multiplicity of guides shown and described are preferably cast in one piece or are formed in several pieces and bolted together.

In Fig. 5 a modification of my invention is shown adapted to cut either straight or curved lines. For cutting curved lines the bed-plate A is furnished with guides corresponding in radius to the radius of tracks C C' for straight lines, with straight and parallel guides adapted to run in tracks $C^6$ $C^7$, the means for driving the bed-plate and for carrying the cutting-tools being similar to that described before in all respects.

Having thus described my invention, I claim—

The combination in a planing-machine of a base-casting in which are formed two or more sets of tracks or guides, each pair of which have the form of arcs of concentric circles and all of which lie substantially in the same horizontal plane, removable bed-plates furnished with one pair of guides corresponding in curvature with and adapted to engage one pair of the tracks or guides in the base, a rack concentric with said guides and secured to said bed-plate, and means, substantially as described for driving said rack.

JAMES MANN.

Witnesses:
CHRISTOPHER FALLON,
CHARLES A. RUTTER.